United States Patent [19]

Alexander et al.

[11] Patent Number: 4,806,840

[45] Date of Patent: Feb. 21, 1989

[54] METHOD AND APPARATUS FOR CHARGING A NICKEL-CADMIUM BATTERY

[75] Inventors: Richard B. Alexander, Clear Lake; Dennis P. Kindschuh, Mason City, both of Iowa

[73] Assignee: Alexander Manufacturing Company, Mason City, Iowa

[21] Appl. No.: 941,592

[22] Filed: Dec. 15, 1986

Related U.S. Application Data

[63] Continuation of Ser. No. 567,262, Dec. 30, 1983, abandoned.

[51] Int. Cl.⁴ ............................................. H02J 7/10
[52] U.S. Cl. ....................................... 320/20; 320/44
[58] Field of Search ................... 320/44, 20, 39, 21, 320/40

[56] References Cited

U.S. PATENT DOCUMENTS

3,895,282  7/1975  Foster et al. ........................ 320/20
4,388,582  6/1983  Saar et al. ........................... 320/20

*Primary Examiner*—R. J. Hickey
*Attorney, Agent, or Firm*—Hugh D. Jaeger

[57] ABSTRACT

The characteristic voltage-versus-time curve for a nickel-cadmium battery on a fast charge, e.g., being charged at the C/1 rate, increases to a peak voltage and thereafter decreases. To ensure that the battery is fully charged, the fast charge is discontinued on the decreasing portion of the voltage-versus-time curve. The fast charge may be stopped when a predetermined negative rate of change of the voltage is obtained. Or the fast charge may be cut off when the battery voltage decreases a predetermined amount below the peak, that is, when the difference between the maximum measured battery voltage and the present battery voltage exceeds a setpoint. After the fast charge is discontinued, a trickle charge, e.g., a C/10 charge or less, may be instituted or the charging current may be interrupted altogether, i.e., the battery charging circuit may be opened.

19 Claims, 6 Drawing Sheets

METHOD AND APPARATUS FOR CHARGING A NICKEL-CADMIUM BATTERY

This application is a continuation of application Ser. No. 567,262, filed Dec. 30, 1983 now abandoned.

BACKGROUND OF THE INVENTION

The invention relates to a method and an apparatus for charging a nickel-cadmium battery. More particularly, the invention permits a nickel-cadmium battery to receive a full charge without a large rise in the temperature of the battery.

Rechargeable nickel-cadmium batteries are presently used in a number of industrial and consumer applications, for example, in communications (such as FM transceivers), medical, photographic, and battery analysis equipment. When recharged, a high battery charging rate is desirable in order to reduce the charging time and, therefore, the time a battery is out of service. Nickel-cadmium (Ni-Cd) batteries are known which are able to withstand a relatively high charging rate. In a conventional fast charge, a current of amperage that is numerically equal to the battery capacity C, in ampere-hours, is supplied to the battery for approximately one hour. This rate is commonly referred to as the C/1 rate. As the battery reaches full charge, the charging rate is reduced or charging is stopped. It is important to control the cutoff of charging so as to assure, on the one hand, that the battery has been fully charged, but to prevent, on the other hand, over-charging which may damage the battery cells.

A known method for battery charging is to apply a fast charge while monitoring the increase in battery voltage, until a predetermined battery voltage is reached. Voltage monitoring methods are unreliable inasmuch as the battery voltage during charging depends upon the condition of the battery prior to instituting the charge and the ambient conditions during the charge, not just the time from the beginning of the charge. Therefore, by controlling the charging cutoff responsive to voltage, a battery can be over-charged or may not be fully charged upon termination of the high charge rate.

Eveready has proposed, in an article entitled "'Eveready' Fast Charge of Nickel-Cadmium Cells" that high-rate charging of fast-charge Ni-Cd batteries be controlled by monitoring battery temperature. As noted therein, at the C/1 rate, the battery temperature increases rapidly as the battery approaches full charge, since the electrical energy supplied to the battery is not converted and stored chemically in the battery but changed into heat.

This rapid temperature increase, indicative of full charge, is used to control the cut-off of a high charging rate, or fast charge, applied to a fast-charge Ni-Cd battery. Several temperature monitoring methods are described. In one temperature monitoring method, the fast charge is stopped when a predetermined battery temperature is exceeded. In another temperature monitoring method, the fast charge is stopped when the rate of change of the battery temperature exceeds a specified value. Both temperature monitoring methods suffer from the need to employ a temperature sensor in close proximity to the battery, which necessitates additional terminals and connections, and additional expense. Moreover, the temperature monitoring methods may be inaccurate because the battery temperature will be a function of and will change with the ambient temperature. Furthermore, temperature sensors generally respond more slowly than sensors for electrical parameters.

SUMMARY OF THE INVENTION

The present invention is a method and apparatus for rapidly charging Ni-Cd batteries, which reliably and accurately determines and terminates the high-rate charging at full battery charge, without the need for temperature sensors or temperature-responsive control equipment. More particularly, the invention is in part the recognition that, in view of the fact that Ni-Cd fast-charge batteries have a characteristic voltage-versus-time curve in which the voltage changes from a positive to a negative slope as the battery reaches full charge, a voltage monitoring control method may be employed, utilizing this characteristic positive-tonegative slope change, to control accurately the charge cutoff point. This is accomplished with equal accuracy and reliability as the previously proposed temperature-responsive controls but without the need for temperature monitoring equipment.

In accordance with the invention, current, preferably at the C/1 rate, is supplied to a nickel-cadmium battery, and the current is interrupted and the fast charge is discontinued on the decreasing portion of the characteristic voltage-versus-time curve, i.e., after the peak voltage is reached. The current may be interrupted when either the rate of change of the battery voltage reaches a predetermined negative value of the battery voltage decreases a predetermined amount below the peak voltage. For instance, for a 12-cell battery rated at 15 volts, 450 milliamp-hours, the fast charge should be discontinued when the battery voltage is 0.3 V below the peak battery voltage. A larger difference, such as 0.45, 0.6, or 0.75 V may be selected, depending upon the type and the number of cells in the battery. Following the interruption of the current associated with the fast charge, the battery may be put on a trickle charge or open circuited, depending upon the type of cell or the application.

In a preferred embodiment of the invention, the battery voltage is measured at a number of sequential points in time, usually, about once every 1 to 3 seconds, to determine, first, when the peak battery voltage is reached and, second, when a predetermined level below the peak is reached, at which time the fast charge is stopped. Specifically, when the fast charge is instituted, the battery voltage is measured and stored. A short time later, the battery voltage is again measured. If the measured value is greater than the stored value (indicating that the battery voltage is on the increasing portion of the characteristic curve), the measured value is substituted for the stored value, and the measurement and comparision steps are repeated. When the measured value becomes less than the stored value (usually indicating that the battery voltage is on the decreasing portion of the characteristic curve), the difference between the measured value and the stored value is compared to a setpoint. If the difference exceeds the setpoint, the fast charge is cut off. In a preferred embodiment of the invention, the setpoint must be exceeded on two consecutive measurements in order to prevent the fast charge from being stopped because of a spurious noise signal.

Appropriate circuits for accomplishing the above steps are provided. For instance, a microprocessorbased circuit is advantageously used to store and compare successive values of the battery voltage in order to determine when the peak voltage is reached and when a predetermined level below the peak is reached.

The invention overcomes the problems associated with known methods and apparatus for charging a nickel-cadmium battery and permits a nickel-cadmium battery to be more completely charged by interrupting the fast charge on the decreasing portion of the characteristic voltage-versus-time curve.

BRIEF DESCRIPTION OF THE DRAWINGS

The above and other advantages and objects of the present invention may be better understood by reference to the following description of exemplary embodiments thereof taken in conjunction with the accompanying drawings, in which.

DETAILED DESCRITPION OF THE PREFERRED EMBODIMENTS

Figure 1:
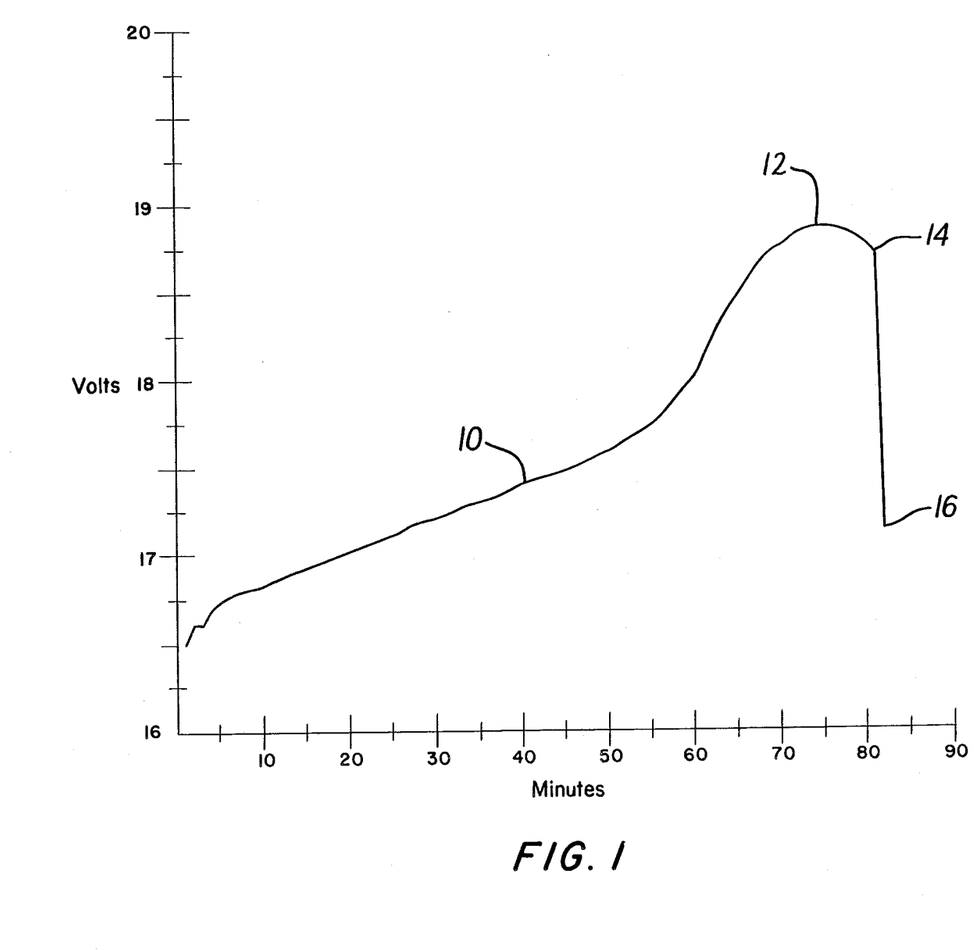
FIG. 1 is a graph showing a characteristic curve of the voltage versus the time on about a C/1 charge for a typical Ni-Cd battery.

FIG. 1 illustrates a typical characteristic curve 10 for a nickel-cadmium (Ni-Cd) battery placed on about a C/1 charge. The curve 10 shows the battery voltage (in volts) versus the time on the charge (in minutes) and is a representative curve for a 10-cell Ni-Cd battery rated at 12 volts, 450 milliampere-hours that is charged with a current of 425 milliamperes. The curve for a particular battery or cell depends upon the initial conditions and the ambient conditions during the charge. Moreover, the curve 10 depends upon the charging current; however, for each of explanation and illustration, the invention will hereinafter be described with the fast charge being about a C/1 charge, but the invention encompasses the use of other charging rates. Furthermore, the voltage of a particular battery depends on the number of cells in the battery, the battery voltage being equal to the sum of the voltages of each individual cell.

The voltage-versus-time curve 10 increases, reaches a peak at about 74 minutes, and then decreases as time increases. Although the battery is fully charged at a point 12, which corresponds to the 74-minute mark, the fast charge should be switched off on the decreasing part of the curve 10, i.e., the portion following the point 12, in order to prevent early switching due to spurious noise signals or a premature plateau.

The temperature-versus-time curve for the battery (not shown) increases slowly at the beginning of the charge and then increases rapidly as the battery becomes fully charged. A typical temperature-versus-time curve is illustrated in the "Eveready" article. This phenomenon is due to the battery's inability to convert all of the electrical energy into chemical energy and store it as the battery becomes fully charged; what is not converted into chemical energy is converted into heat, thereby increasing the temperature of the battery.

Accordingly, the C/1 charge should be stopped and the associated current should be interrupted at a point 14 on the decreasing portion of the voltage-versus-time curve 10 before the battery temperature becomes inordinately high. FIG. 1 depicts the battery voltage, which drops drastically to a point 16, after the hard charge is switched to a trickle charge at point 14. As indicated above, the time of switching may be ascertained by, first, determining when the battery voltage reaches the peak and, second, determining when the battery voltage decreases a predetermined amount below the peak. Alternatively, the rate of change of the battery voltage may be calculated, and the fast charge may be cutoff when a predetermined negative rate of change of the battery is obtained, since the point 14 is associated with a unique negative slope of the curve 10.

Figure 2:
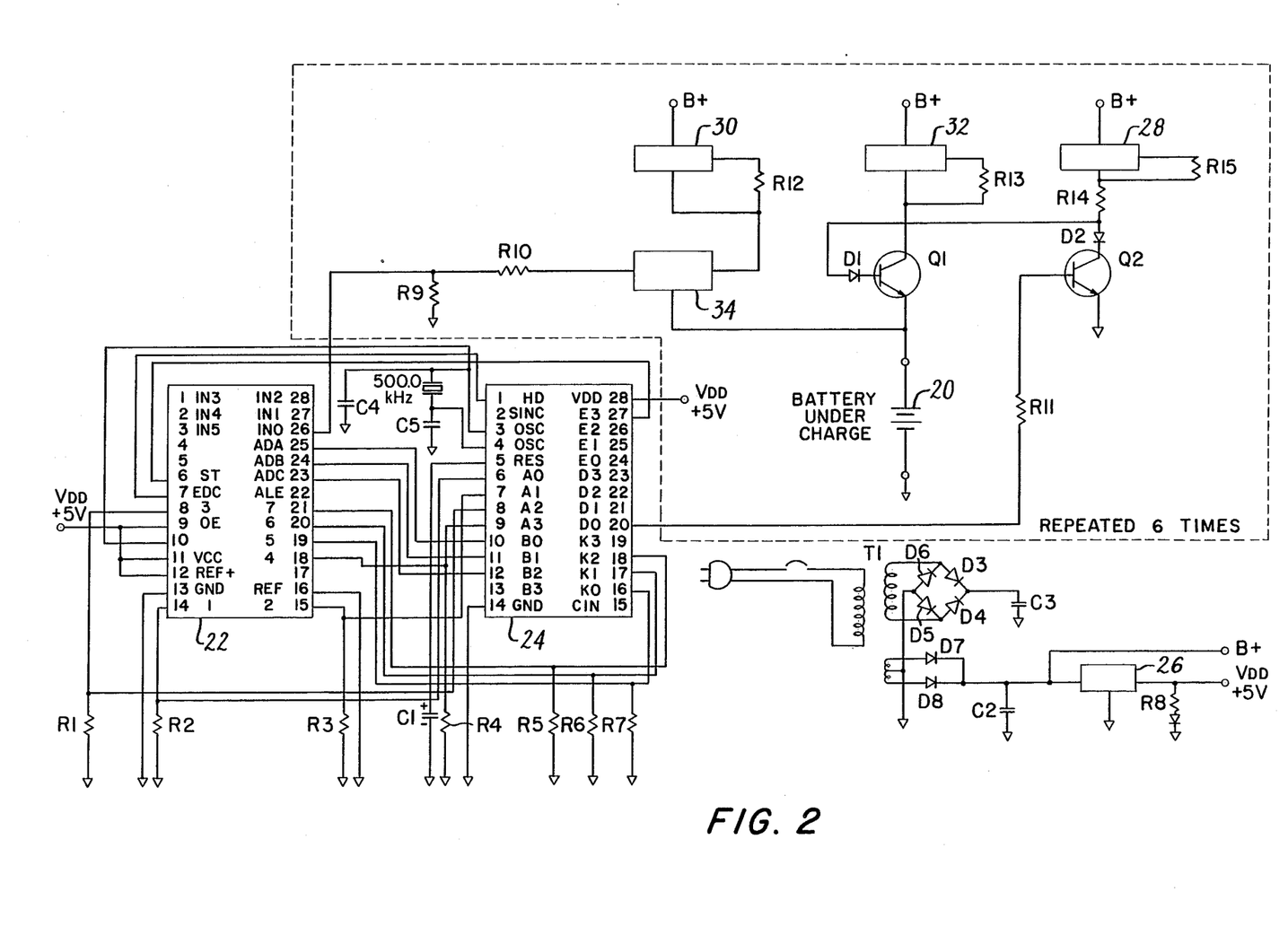
FIG. 2 is a schematic diagram of a circuit according to an embodiment of the invention.

FIG. 2 is a schematic diagram of a circuit for providing a fast charge to a Ni-Cd battery and for discontinuing the fast charge when, following the peak, the battery voltage falls a predetermined amount below the peak. The circuit shown in FIG. 2 supplies up to six batteries 20 with a high current during a fast charge and monitors the voltages of the batteries during the charge. The values for the circuit components illustrated in FIG. 2 are set forth below in Table II.

The section of the circuit shown in the upper right of the drawing, which may be repeated up to 6 times, supplies a high charging current (a hard charge) or a low charging curernt (a trickle charge) to each battery being charged and isolates the monitoring portion of circuitry from the charging portion of the circuitry. The low charging current is supplied via a voltage regulation circuit 28, e.g., a model no. 78L05. Similarly, a high charging current is supplied through a voltage regulator 32, e.g., a model no. LM317T. The resistance of a resistor R13 is selected so that the high charging current is suitable for the battery. For instance, if the resistor R13 has a value of 2 ohms, the high charging current will be about 600 milliamperes. The monitoring circuit is isolated from the charging circuit by way of a voltage regulator 30, which may also be a model no. 78L05, and an isolation relay 34, e.g., a PRMA 1A05.

The section of the circuit shown in the lower right of the drawing provides a voltage of approximately 40 V to the charging and isolation circuits through a terminal B+; this section of the circuit also supplies a +5 volt signal, i.e., VDD, to an analog-to-digital converter (ADC) 22, preferably a National Semiconductor model no. 0808, and a microprocessor 24, preferably an OKI Semiconductor model no. 5842.

The voltages of each of the batteries 20 being charged are supplied to the ADC 22 through the input terminals IN0 through IN6. The ADC 22 may sample each battery voltage as often as once per second or as little as once every three seconds, depending upon the input conditions (assuming a 500-KHz clock rate). Three bits, i.e., terminals B0, B1, and B2, from the microprocessor 24 are used to address an analog multiplexer in the ADC 22 at terminals ADA, ADB, and ADC in order to select one of the six input voltages for conversion to a 7-bit binary value. The ADC 22 supplies the 7-bit binary representation of the selected battery voltage to the microprocessor 24 over the lines leading from the terminals 1 through 7 of the ADC 22 to the terminals A0-A3 and K0-K2 of the microprocessor 24. The ADC 22 does not provide the microprocessor 24 with the least significant bit of the converted analog voltage. Accordingly, for an input range of 5 volts, one binary increment from the ADC 22 corresponds to 39.1 millivolts, and for a 20-volt range, one binary increment of the ADC 22 is about 156 millivolts.

Each 7-bit value from the ADC 22 is assigned to two random access memory (RAM) locations (a total of 8 bits) in the microprocessor 24. The highest value read from each input is stored in 7 of the 8 bits. The processing and comparison steps performed in the microprocessor 24 will be described in detail below, with reference to FIGS. 3A–D. However, in order to better understand the device, the output of the microprocessor will now be described: When the circuit determines that the high charge for a particular battery should be disontinued, a high output is selectively provided at one of the output terminals D0–D3 or E0–E1. The high output signal turns a transistor Q2 on, which causes a transistor Q1 to turn off, thereby switching from a hard charge to a trickle charge. This action of the transistor Q2 also energizes a green light-emitting diode D2 and deenergizes a red light-emitting diode D1. To ensure against false triggering of the low current charging mode due to transient irregularities which may occur, the circuit shown in FIG. 2 does not supply the output signal until the second consecutive time that the setpoint is exceeded.

A typical setpoint for the circuit depicted in FIG. 2 is 2 binary increments, which corresponds to approximately 0.3 volts on the 20-volt range. But, depending upon the battery and the application, other setpoints may be selected, e.g., setpoints of 3, 4, or 5 binary increments corresponding to approximately 0.45, 0.6, or 0.75 volts, respectively. In the circuit illustrated, terminal 3 of port B and terminal 3 of port K are used to select the desired setpoint in accordance with the table below:

TABLE I

| No. Of Increments | Volts In 20-V Range | Port B Bit 3 | Port K Bit 3 |
|---|---|---|---|
| 2 | 0.3 | 0 | 0 |
| 3 | 0.45 | 1 | 0 |
| 4 | 0.6 | 0 | 1 |
| 5 | 0.75 | 1 | 1 |

Figure 3A:
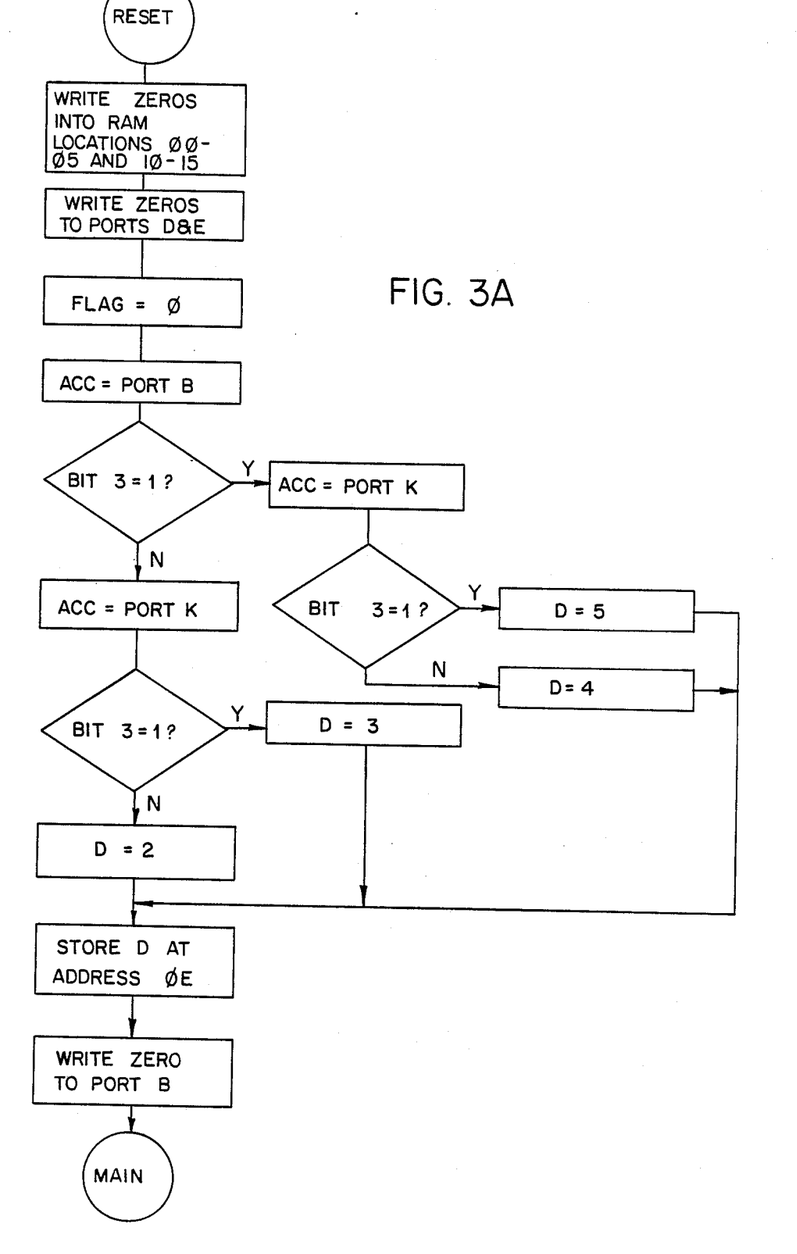
FIGS. 3A-D are flowcharts symbolically depicting a method according to an embodiment of the invention.
Figure 3B:
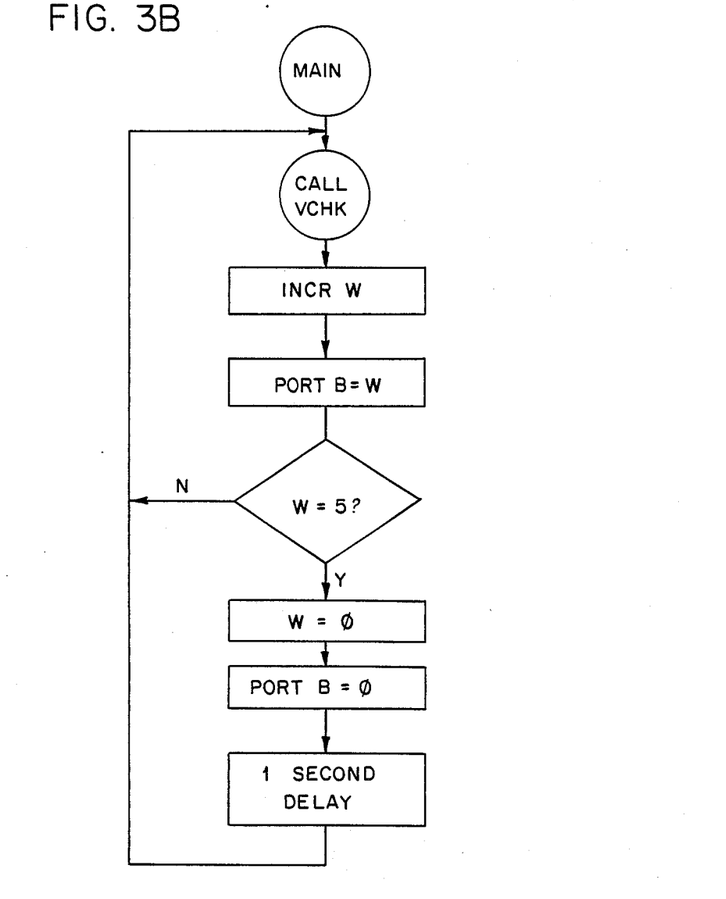

FIGS. 3A–D are flowcharts symbolically depicting the operation of the microprocessor 24. Specifically, FIG. 3A illustrates the initialization routine of the microprocessor. The initialization routine accomplishes the following: (a) clears the RAM locations in which the digital representations of the battery voltages will be stored; (b) sets a counter W, which determines the particular battery voltage to be converted to digital form and supplied to the microprocessor, to 0; (c) clears ports D and E, the terminals which are used to supply output signals for switching to a trickle charge; (d) determines the value of the setpont D and stores it; and (e) clears port B, which is used to control the multiplexer in the ADC 22.

Figure 3C:
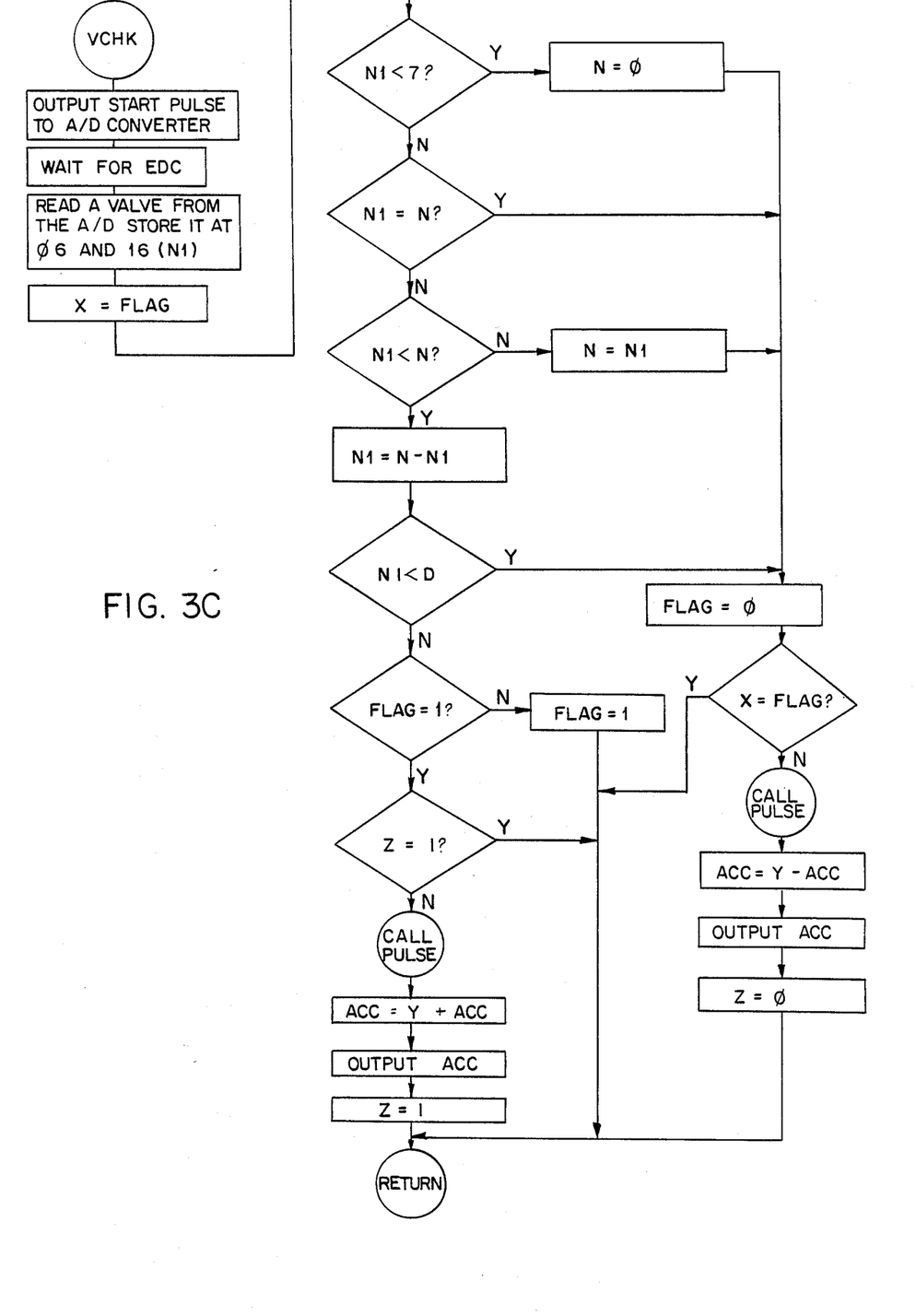

After the initialization routine is completed, the MAIN program loop (see FIG. 3B) is entered. The MAIN program loop maintains the W counter; specifically, it increments the counter W by 1 following the voltage comparison steps, so that the voltage comparison steps are performed serially for each of the batteries being charged. During the MAIN program loop a subroutine VCHK, the flowchart of which is shown in FIG. 3C, is called. This subroutine uses the value of W as a pointer to the RAM locations corresponding to the input battery voltage selected by port B. Each time the program returns from the VCHK subroutine, the counter W is incremented by 1 and then output to port B, thereby sequentially selecting the next battery voltage via the multiplexer in the ADC 22. When the value W reaches 6, that is, after all of the battery voltages have been sampled, the value W and the port B are reset to 0, and the microprocessor waits for 1 second before repeating the sequential sampling operation.

Figure 3D:
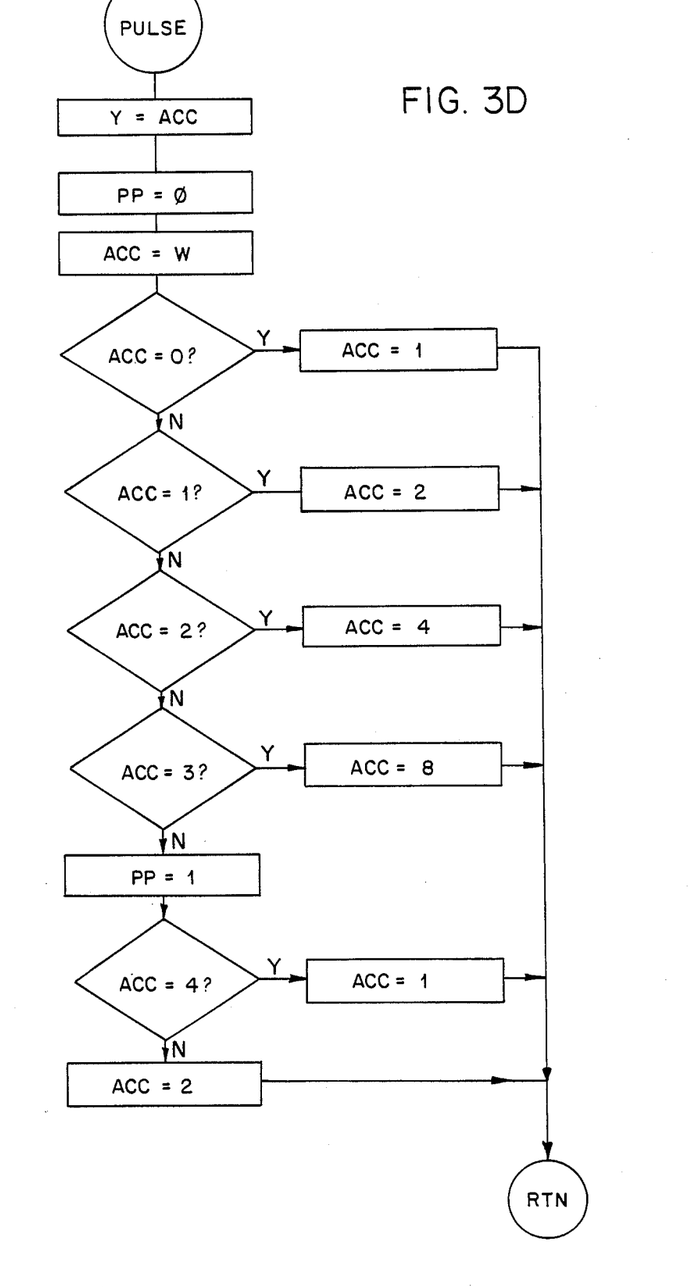

The subroutine VCHK performs various comparison operations on the binary representation of the battery voltage provided by the ADC 22. If the newly measured value, N1, is less than the binary value corresponding to 7, zeros are written in the corresponding RAM locations for the particular battery. If not, the new value, N1, is compared with a previously measured value, N. The new value, N1, is stored in place of the old value, N, when N1 is greater than N, which occurs on the increasing part of the voltage-versus-time curve. But when N1 is less than N, which occurs on the decreasing part of the voltage-versus-time curve, the difference is compared to the setpoint D. After the difference is greater than the setpoint on two consecutive occasions, the PULSE subroutine, shown in FIG. 3D, is called.

The PULSE subroutine determines which one of the output terminals D0–D3 or E0–E1 should be switched from low to high or from high to low. Low-to-high switching turns on one of the transistors Q2 to initiate a trickle charge for a particular battery. High-to-low switching takes place when the battery is removed after being fully charged. Each bit of the variable ACC corresponds to one of the output terminals D0–D3 and E0–E1 and determines whether the output signal at the terminal will be high (when the corresponding bit is 1) or low (when the corresponding bit is 0). Accordingly, the PULSE subroutine determines which output terminal to switch by storing the old value of ACC in the Y location, ascertaining the value of the counter W, and setting the variable ACC equal to the binary value corresponding to the battery to be switched. Following the return to the VCHK subroutine, the new value of ACC is added (low-to-high switching) or subtracted (high-to-low switching) to the old value of ACC, which is stored in the Y location. Then, the value of ACc is output to effect the switching.

TABLE II

| | |
|---|---|
| R1 | 100 kilohms |
| R2 | 100 kilohms |
| R3 | 100 kilohms |
| R4 | 100 kilohms |
| R5 | 100 kilohms |
| R6 | 100 kilohms |
| R7 | 100 kilohms |
| R8 | 270 ohms |
| R9 | 10 kilohms |
| R10 | 39 kilohms |
| R11 | 10 kilohms |
| R12 | 510 ohms |
| R13 | 2 ohms |
| R14 | 510 ohms |
| R15 | 270 ohms |
| C1 | 68 microfarads |
| C2 | 3300 microfarads |
| C3 | 5400 microfarads |
| C4 | 47 picofarads |
| C5 | 47 picofarads |
| Q1 | 2N5190 |
| Q2 | D33D24 |
| D1 | MV5752 |
| D2 | MV64521 |
| D3 | ECG 5312 |
| D4 | ECG 5312 |
| D5 | ECG 5312 |
| D6 | ECG 5312 |
| D7 | ECG R250 |
| D8 | ECG R250 |
| T1 | NT4149 |

Although the invention has been described herein with respect to specific embodiments thereof, it will be understood that various modifications and variations may be made thereto wihtout departing from the inventive concepts disclosed. All such modifications and variations are intended to be included within the spirit and scope of the appended claims.

We claim:

1. A method for charging a nickel-cadmium battery comprising the steps of:
    a. supplying a constant charging current to said battery;
    b. measuring the battery voltage, while said battery is receiving said charging current, at intervals not greater than 30 seconds;
    c. comparing the current measured voltage with the next previous measured voltage to determine the voltage change during the last interval; and,
    d. terminating said charging current when the individual voltage changes during two successive intervals each exceed a predetermined negative value.

2. A method according to claim 1 wherein the amperage value of said constant charging current is substantially equal to the value of battery capacity in ampere hours.

3. A method according to claim 1 further including the step of:
    d. after termination of said constant charging current, continuously supplying a second charging current substantially less than charging current.

4. A method according to claim 1 wherein said second charging current is less than 0.15 of said first charging current.

5. A method according to claim 1 wherein said second charging current is in the range 0.05–0.15 of said first charging current.

6. A method according to claim 1 wherein said second charging current is 0.10 of said first charging current.

7. A method of charging a nickel-cadmium battery comprising the steps of:
    a. supplying a charging current to said battery;
    b. measuring said battery voltage while continuing to apply said charging current;
    c. storing said measured battery voltage;
    d. measuring said battery voltage after a predetermined interval while continuing to apply said charging current;
    e. comparing the stored battery voltage of step c with the measured battery voltage of step d;
    f. comparing the result of step e with a predetermined setpoint value if the comparison indicates that the voltage of step b is greater than the voltage of step d;
    g. storing an indicator if the result of the comparison of step f indicates that the result of step f is greater than said setpoint value, and erasing an indicator stored on the previous sequence if the comparison of step f indicates that the setpoint value has not been exceeded;
    h. repeating steps a through g until two successive comparisons of step f indicate that the result of step e is greater than said setpoint value; and,
    i. terminating said charging current when two successive comparisons of step f indicate that the result of step e is greater than said setpoint value.

8. A method according to claim 7 wherein the interval of setp d is less than 45 seconds.

9. A method according to claim 7 wherein the interval of step d is less than 5 seconds.

10. A method according to claim 7 wherein the interval of step d is less than 3 seconds.

11. a method according to claim 7 wherein the interval of step d is 1 second or less.

12. A method according to claim 7 wherein said charging current is approximately equal tot he ampere hour capacity of the battery.

13. A method of charging a nickel-cadmium battery comprising the steps of:
    a. supplying a charging current to said battery;
    b. measuring the battery voltage while continuing to supply a charging current to said battery;
    c. measuring the battery voltage after a predetermined interval while continuing to supply a charging current to said battery;
    d. determining if the battery voltage has dropped more than a predetermined setpoint value during said predetermined interval; and,
    e. terminating said charging current when the battery voltage drops more than said setpoint value on two successive measurements.

14. A method according to claim 13 wherein the ampere value of said charging current is approximately equal to the value of the battery capacity in ampere hours.

15. A method according to claim 13 wherein the interval of step c is less than 3 seconds.

16. A method of charging a nickel-cadmium battery under the control of a microprocessor comprising the steps of:
    a. continuously supplying a constant charging current to said battery through a switch controlled in response to the signal at a first output port of said microprocessor;
    b. monitoring the battery voltage at intervals not greater than 30 seconds by connecting said battery to an analog to digital converter, while continuing to supply said charging current, through a switch controlled in response to the signal at a second output port of said microprocessor and transmitting the digital output of said analog to digital converter to an input port of said microprocessor;
    c. processing the digital values transmitted to said input port to determine when the monitored battery voltage drops more than a predetermined setpoint value during two successive intervals; and,
    d. developing a signal at said first output port to open said switch when the processing of step c indicates that the setpoint amount has been exceeded during two successive intervals.

17. A method according to claim 16 further including the steps of multiplexing the inputs and outputs of said microprocessor between a plurality of nickel-cadmium batteries and switches to simultaneously charge said batteries.

18. A system for charging a nickel cadmium battery comprising:
    a. a source of cfiarging current;
    b. a charging current switch, operable in response to a control signal, for connecting said source of charging current to a battery;
    c. analog to digital converter means, connectable to said battery in response to a control signal for developing a digital output signal representative of the voltage of said battery while connected to said source of charging current;

d. microprocessor control means, operating under program control, for developing said charging current switch control signal and said analog to digital converter control signal to connect said battery to said source of charging current and periodically simultaneously connect said analog to digital converter to said battery and transfer said digital output signal to said microprocessor;

e. setpoint storage means in said microprocessor control means for storing a digital value representative of a predetermined voltage drop of said battery;

f. said microprocessor program control including a sequence of program steps effective to cause said analog to digital converter to be periodically simultaneously connected to said battery and to compare the change from the previous digital output signal from said battery with said stored setpoint value and to store an indication when said setpoint is exceeded; and, g. said microprocessor program control further including a sequence of program steps effective to terminate said charging current switch control signal on the occurrence of an indication that the setpoint has been exceeded on two successive comparisons of the change in battery voltage to said setpoint value.

19. A system according to claim 18 further including a plurality of charging current switches and means for storing an indication that the setpoint has been exceeded for a plurality of batteries.

* * * * *